United States Patent
Ho et al.

(10) Patent No.: US 9,762,901 B2
(45) Date of Patent: Sep. 12, 2017

(54) VIDEO CODING METHOD USING AT LEAST EVALUATED VISUAL QUALITY AND RELATED VIDEO CODING APPARATUS

(71) Applicant: MEDIATEK INC., Hsin-Chu (TW)

(72) Inventors: Cheng-Tsai Ho, Taichung (TW); Chi-Cheng Ju, Hsinchu (TW); Ding-Yun Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 206 days.

(21) Appl. No.: 14/195,868

(22) Filed: Mar. 4, 2014

(65) Prior Publication Data

US 2014/0254662 A1 Sep. 11, 2014

Related U.S. Application Data

(60) Provisional application No. 61/776,053, filed on Mar. 11, 2013.

(51) Int. Cl.
*H04N 19/117* (2014.01)
*H04N 19/154* (2014.01)
(Continued)

(52) U.S. Cl.
CPC ..... *H04N 19/00066* (2013.01); *H04N 19/117* (2014.11); *H04N 19/154* (2014.11);
(Continued)

(58) Field of Classification Search
CPC ........... H04N 19/00066; H04N 19/117; H04N 19/154; H04N 19/18; H04N 19/196; H04N 19/46; H04N 19/82
(Continued)

(56) References Cited

U.S. PATENT DOCUMENTS 6,160,846 A 12/2000 Chiang
6,233,283 B1 5/2001 Chiu
(Continued)

FOREIGN PATENT DOCUMENTS

CN 1471319 A 1/2004
CN 1669338 A 9/2005
(Continued)

OTHER PUBLICATIONS

"International Search Report" mailed on Jun. 30, 2014 for International application No. PCT/CN2014/073176, International filing date: Mar. 11, 2014.
(Continued)

*Primary Examiner* — Christopher S Kelley
*Assistant Examiner* — Kathleen Walsh
(74) *Attorney, Agent, or Firm* — Winston Hsu

(57) ABSTRACT

One video coding method includes at least the following steps: utilizing a visual quality evaluation module for evaluating visual quality based on data involved in a coding loop; and referring to at least the evaluated visual quality for performing de-blocking filtering. Another video coding method includes at least the following steps: utilizing a visual quality evaluation module for evaluating visual quality based on data involved in a coding loop; and referring to at least the evaluated visual quality for deciding a target coding parameter associated with de-blocking filtering.

22 Claims, 6 Drawing Sheets

(51) Int. Cl.
H04N 19/196 (2014.01)
H04N 19/82 (2014.01)
H04N 19/46 (2014.01)
H04N 19/18 (2014.01)

(52) U.S. Cl.
CPC ........... *H04N 19/196* (2014.11); *H04N 19/82* (2014.11); *H04N 19/18* (2014.11); *H04N 19/46* (2014.11)

(58) Field of Classification Search
USPC .......................... 375/240.03, 240.24, 240.29
See application file for complete search history.

(56) References Cited

U.S. PATENT DOCUMENTS

| | | | |
|---|---|---|---|
| 7,742,532 B2* | 6/2010 | Jeon | H04N 19/105 375/240.24 |
| 7,873,727 B2 | 1/2011 | Pal | |
| 8,077,775 B2 | 12/2011 | He | |
| 8,111,300 B2 | 2/2012 | Hwang | |
| 8,345,777 B2* | 1/2013 | Lee | H04N 19/139 375/240.29 |
| 9,282,328 B2 | 3/2016 | Chen | |
| 2003/0128754 A1 | 7/2003 | Akimoto | |
| 2003/0206587 A1* | 11/2003 | Gomila | H04N 19/176 375/240.12 |
| 2003/0206664 A1* | 11/2003 | Gomila | H04N 19/176 382/268 |
| 2004/0114817 A1 | 6/2004 | Jayant | |
| 2004/0156559 A1* | 8/2004 | Cheng | H04N 19/527 382/286 |
| 2004/0208392 A1* | 10/2004 | Raveendran | G06T 5/002 382/268 |
| 2005/0243915 A1* | 11/2005 | Kwon | H04N 19/159 375/240.03 |
| 2006/0114997 A1 | 6/2006 | Lelescu | |
| 2006/0215766 A1 | 9/2006 | Wang | |
| 2006/0238445 A1 | 10/2006 | Wang | |
| 2008/0069247 A1* | 3/2008 | He | H04N 19/865 375/240.29 |
| 2008/0117981 A1* | 5/2008 | Lee | H04N 19/159 375/240.24 |
| 2008/0240252 A1* | 10/2008 | He | H04N 19/176 375/240.24 |
| 2009/0323803 A1* | 12/2009 | Gomila | H04N 19/172 375/240.02 |
| 2010/0220796 A1* | 9/2010 | Yin | H04N 19/159 375/240.29 |
| 2010/0296588 A1* | 11/2010 | Fujii | H04N 5/232 375/240.29 |
| 2011/0033119 A1 | 2/2011 | Rezazadeh | |
| 2011/0211637 A1 | 9/2011 | Blum | |
| 2011/0222607 A1* | 9/2011 | An | H04N 19/159 375/240.24 |
| 2011/0235715 A1 | 9/2011 | Chien | |
| 2011/0255589 A1 | 10/2011 | Saunders | |
| 2011/0280321 A1* | 11/2011 | Chou | H04N 19/176 375/240.29 |
| 2012/0082241 A1 | 4/2012 | Tsai | |
| 2012/0163452 A1 | 6/2012 | Horowitz | |
| 2012/0177104 A1 | 7/2012 | Budagavi | |
| 2012/0201475 A1 | 8/2012 | Carmel | |
| 2012/0257681 A1* | 10/2012 | Sato | H04N 19/139 375/240.25 |
| 2012/0328004 A1 | 12/2012 | Coban et al. | |
| 2012/0328029 A1* | 12/2012 | Sadafale | H04N 19/176 375/240.29 |
| 2013/0051454 A1 | 2/2013 | Sze | |
| 2013/0051455 A1 | 2/2013 | Sze | |
| 2013/0083844 A1 | 4/2013 | Chong | |
| 2013/0094569 A1 | 4/2013 | Chong | |
| 2013/0094572 A1 | 4/2013 | Van der Auwera | |
| 2013/0177068 A1 | 7/2013 | Minoo | |
| 2013/0243090 A1 | 9/2013 | Li | |
| 2013/0318253 A1 | 11/2013 | Kordasiewicz | |
| 2013/0343447 A1 | 12/2013 | Chen | |
| 2014/0002670 A1* | 1/2014 | Kolarov | H04N 17/004 348/180 |
| 2014/0056363 A1* | 2/2014 | He | H04N 19/86 375/240.24 |
| 2014/0160239 A1 | 6/2014 | Tian | |
| 2014/0254659 A1* | 9/2014 | Ho | H04N 19/00066 375/240.02 |
| 2014/0254662 A1 | 9/2014 | Ho | |
| 2014/0254663 A1* | 9/2014 | Ho | H04N 19/00066 375/240.05 |
| 2014/0254680 A1* | 9/2014 | Ho | H04N 19/00066 375/240.16 |
| 2014/0254689 A1* | 9/2014 | Ho | H04N 19/00066 375/240.26 |
| 2014/0321552 A1* | 10/2014 | He | H04N 19/00909 375/240.16 |
| 2014/0334559 A1 | 11/2014 | Kim | |
| 2016/0044332 A1 | 2/2016 | Maaninen | |

FOREIGN PATENT DOCUMENTS

| | | |
|---|---|---|
| CN | 1694500 A | 11/2005 |
| CN | 1695164 A | 11/2005 |
| CN | 101090502 A | 12/2007 |
| CN | 101232619 A | 7/2008 |
| CN | 101325711 A | 12/2008 |
| CN | 101489130 A | 7/2009 |
| CN | 102150429 A | 8/2011 |
| CN | 102415088 A | 4/2012 |
| CN | 102685472 A | 9/2012 |
| WO | 2013030833 A1 | 3/2013 |
| WO | 2013074365 A1 | 5/2013 |

OTHER PUBLICATIONS

"International Search Report" mailed on Jun. 23, 2014 for International application No. PCT/CN2014/073146, International filing date:Mar. 10, 2014.

"International Search Report" mailed on Jun. 13, 2014 for International application No. PCT/CN2014/073171, International filing date:Mar. 11, 2014.

"International Search Report" mailed on Jun. 3, 2014 for International application No. PCT/CN2014/073178, International filing date:Mar. 11, 2014.

"International Search Report" mailed on Jun. 18, 2014 for International application No. PCT/CN2014/073167, International filing date:Mar. 11, 2014.

Chikkerur et al., "Objective Video Quality Assessment Methods: A Classification, Review, and Performance Comparison", IEEE Transactions on Broadcasting, vol. 57, No. 2, Jun. 2011, p. 165-182.

Chih-Ming Fu et al., "Sample Adaptive Offest for HEVC", 2011 IEEE.

* cited by examiner

FIG. 2

VIDEO CODING METHOD USING AT LEAST EVALUATED VISUAL QUALITY AND RELATED VIDEO CODING APPARATUS

CROSS REFERENCE TO RELATED APPLICATIONS

This application claims the benefit of U.S. provisional application No. 61/776,053, filed on Mar. 11, 2013 and incorporated herein by reference.

BACKGROUND

The disclosed embodiments of the present invention relate to video coding, and more particularly, to a video coding method using at least evaluated visual quality determined by one or more visual quality metrics and a related video coding apparatus.

The conventional video coding standards generally adopt a block based (or coding unit based) coding technique to exploit spatial redundancy. For example, the basic approach is to divide the whole source frame into a plurality of blocks (coding units), perform prediction on each block (coding unit), transform residues of each block (coding unit) using discrete cosine transform, and perform quantization and entropy encoding. Besides, a reconstructed frame is generated in a coding loop to provide reference pixel data used for coding following blocks (coding units). For certain video coding standards, in-loop filter(s) may be used for enhancing the image quality of the reconstructed frame. For example, a de-blocking filter is included in an H.264 coding loop, and a de-blocking filter and a sample adaptive offset (SAO) filter are included in an HEVC (High Efficiency Video Coding) coding loop.

Generally speaking, the coding loop is composed of a plurality of processing stages, including transform, quantization, intra/inter prediction, etc. Based on the conventional video coding standards, one processing stage selects a video coding mode based on pixel-based distortion value derived from a source frame (i.e., an input frame to be encoded) and a reference frame (i.e., a reconstructed frame generated during the coding procedure). For example, the pixel-based distortion value may be a sum of absolute differences (SAD), a sum of transformed differences (SATD), or a sum of square differences (SSD). However, the pixel-based distortion value merely considers pixel value differences between pixels of the source frame and the reference frame, and sometimes is not correlated to the actual visual quality of a reconstructed frame generated from decoding an encoded frame. Specifically, based on experimental results, different processed images, each derived from an original image and having the same pixel-based distortion (e.g., the same mean square error (MSE)) with respect to the original image, may present different visual quality to a viewer. That is, the smaller pixel-based distortion does not mean better visual quality in the human visual system. Hence, an encoded frame generated based on video coding modes each selected due to a smallest pixel-based distortion value does not guarantee that a reconstructed frame generated from decoding the encoded frame would have the best visual quality.

SUMMARY

In accordance with exemplary embodiments of the present invention, a video coding method using at least evaluated visual quality obtained by one or more visual quality metrics and a related video coding apparatus are proposed.

According to a first aspect of the present invention, an exemplary video coding method is disclosed. The exemplary video coding method includes: utilizing a visual quality evaluation module for evaluating visual quality based on data involved in a coding loop; and referring to at least the evaluated visual quality for performing de-blocking filtering.

According to a second aspect of the present invention, an exemplary video coding method is disclosed. The exemplary video coding method includes: utilizing a visual quality evaluation module for evaluating visual quality based on data involved in a coding loop; and referring to at least the evaluated visual quality for deciding a target coding parameter associated with de-blocking filtering.

According to a third aspect of the present invention, an exemplary video coding apparatus is disclosed. The exemplary video coding apparatus includes a visual quality evaluation module and a coding circuit. The visual quality evaluation module is arranged to evaluate visual quality based on data involved in a coding loop. The coding circuit has the coding loop included therein, and is arranged to refer to at least the evaluated visual quality for performing de-blocking filtering.

According to a fourth aspect of the present invention, another exemplary video coding apparatus is disclosed. The video coding apparatus includes a visual quality evaluation module and a coding circuit. The visual quality evaluation module is arranged to evaluate visual quality based on data involved in a coding loop. The coding circuit has the coding loop included therein, and is arranged to refer to at least the evaluated visual quality for deciding a target coding parameter associated with de-blocking filtering.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating boundary strength settings for a plurality of block boundaries.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to incorporate characteristics of a human visual system into a video coding procedure to improve the video compression efficiency or visual quality. More specifically, visual quality evaluation is involved in the video coding procedure such that a reconstructed frame generated from decoding an encoded frame is capable of having enhanced visual quality. Further details of the proposed visual quality based video coding design are described as below.

Figure 1:
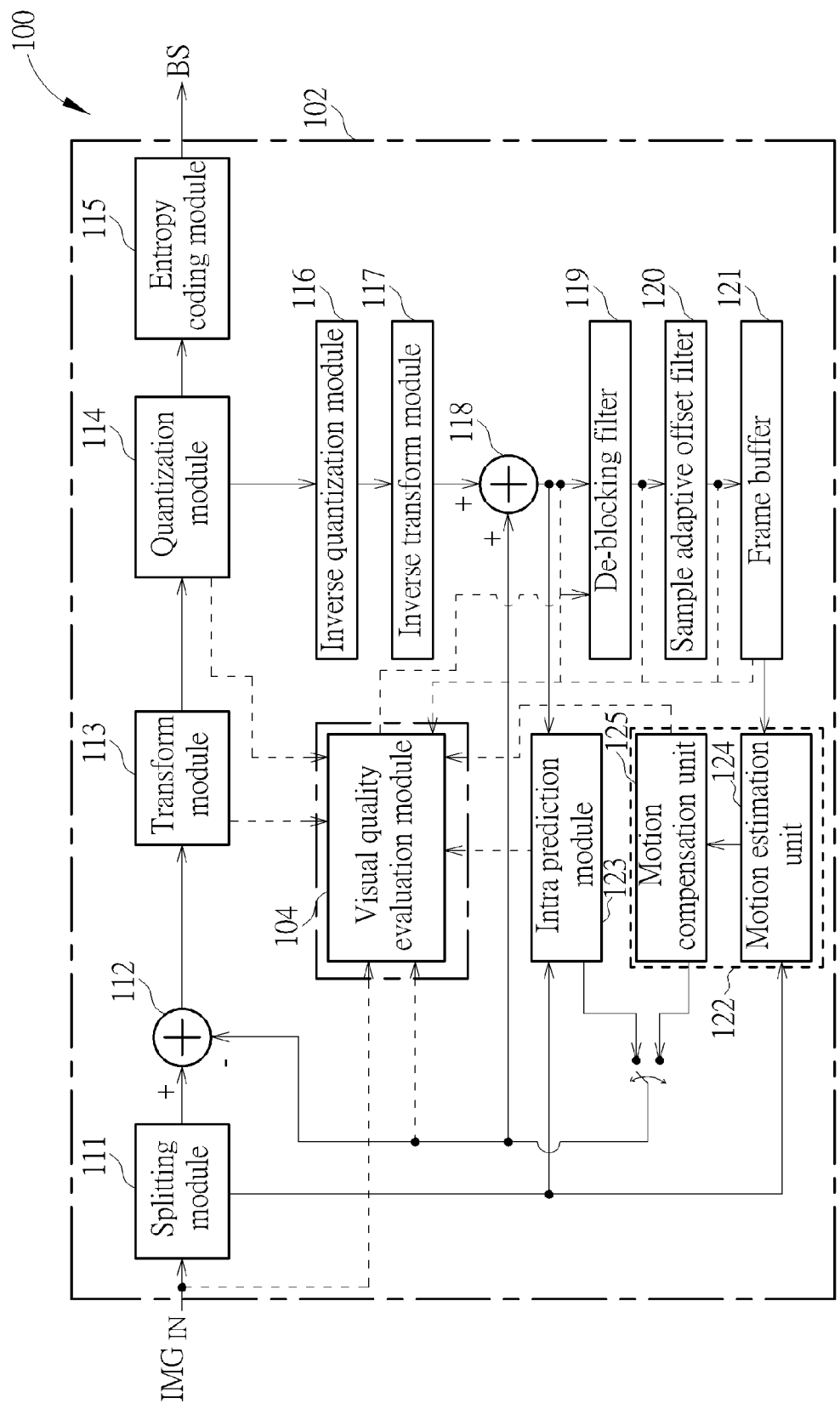
FIG. 1 is a block diagram illustrating a video coding apparatus according to an embodiment of the present invention.

FIG. 1 is a block diagram illustrating a video coding apparatus according to an embodiment of the present invention. The video coding apparatus 100 is used to encode a source frame $IMG_{IN}$ to generate a bitstream BS carrying encoded frame information corresponding to the source frame $IMG_{IN}$. In this embodiment, the video coding apparatus 100 includes a coding circuit 102 and a visual quality evaluation module 104. By way of example, but not limitation, the architecture of the coding circuit 102 may be configured based on any conventional video encoding architecture. It should be noted that the coding circuit 102 may follow the conventional video encoding architecture to have a plurality of processing stages implemented therein; however, this by no means implies that each of the processing stages included in the coding circuit 102 must be implemented using a conventional design. For example, any of the processing stages that is associated with the visual quality evaluation performed by the visual quality evaluation module 104 and/or is affected/controlled by the visual quality obtained by the visual quality evaluation module 104 still falls within the scope of the present invention.

As shown in FIG. 1, the coding circuit 102 includes a coding loop composed of a splitting module 111, a subtractor (i.e., an adder configured to perform a subtraction operation) 112, a transform module 113, a quantization module 114, an inverse quantization module 116, an inverse transform module 117, an adder 118, a de-blocking filter 119, a sample adaptive offset (SAO) filter 120, a frame buffer 121, an inter prediction module 122, and an intra prediction module 123, where the inter prediction module 122 includes a motion estimation unit 124 and a motion compensation unit 125. The coding circuit 102 further includes an entropy coding module 115 arranged to generate the bitstream BS by performing entropy encoding upon quantized coefficients generated from the quantization module 114. It should be noted that one or both of the de-blocking filter 119 and the SAO filter 120 may be omitted/bypassed for certain applications. That is, the de-blocking filter 119 and/or the SAO filter 120 may be optional, depending upon actual design requirement. As a person skilled in the pertinent art should readily understand fundamental operations of the processing stages included in the coding circuit 102, further description is omitted here for brevity. Concerning one or more of the processing stages that are affected/controlled by the visual quality determined by the visual quality evaluation module 104, further description will be given as below.

One key feature of the present invention is using the visual quality evaluation module 104 to evaluate visual quality based on data involved in the coding loop of the coding circuit 102. In one embodiment, the data involved in the coding loop and processed by the visual quality evaluation module 104 may be raw data of the source frame $IMG_{IN}$. In another embodiment, the data involved in the coding loop and processed by the visual quality evaluation module 104 may be processed data derived from raw data of the source frame $IMG_{IN}$. For example, the processed data used to evaluate the visual quality may be transformed coefficients generated by the transform module 113, quantized coefficients generated by the quantization module 114, reconstructed pixel data before the optional de-blocking filter 119, reconstructed pixel data after the optional de-blocking filter 119, reconstructed pixel data before the optional SAO filter 120, reconstructed pixel data after the optional SAO filter 120, reconstructed pixel data stored in the frame buffer 121, motion-compensated pixel data generated by the motion compensation unit 125, or intra-predicted pixel data generated by the intra prediction module 123.

The visual quality evaluation performed by the visual quality evaluation module 104 may calculate one or more visual quality metrics to decide one evaluated visual quality. For example, the evaluated visual quality is derived from checking at least one image characteristic that affects human visual perception, and the at least one image characteristic may include sharpness, noise, blur, edge, dynamic range, blocking artifact, mean intensity (e.g., brightness/luminance), color temperature, scene composition (e.g., landscape, portrait, night scene, etc.), human face, animal presence, image content that attracts more or less interest (e.g., region of interest (ROI)), spatial masking (i.e., human's visual insensitivity of more complex texture), temporal masking (i.e., human's visual insensitivity of high-speed moving object), or frequency masking (i.e., human's visual insensitivity of higher pixel value variation). By way of example, the noise metric may be obtained by calculating an ISO 15739 visual noise value VN, where $VN=\sigma_{L*}+0.852\cdot\sigma_{u*}+0.323\cdot\sigma_{u*}$. Alternatively, the noise metric may be obtained by calculating other visual noise metric, such as an S-CIELAB metric, a vSNR (visual signal-to-noise ratio) metric, or a Keelan NPS (noise power spectrum) based metric. The sharpness/blur metric may be obtained by measuring edge widths. The edge metric may be a ringing metric obtained by measuring ripples or oscillations around edges.

In one exemplary design, the visual quality evaluation module 104 calculates a single visual quality metric (e.g., one of the aforementioned visual quality metrics) according to the data involved in the coding loop of the coding circuit 102, and determines each evaluated visual quality solely based on the single visual quality metric. In other words, one evaluated visual quality may be obtained by referring to a single visual quality metric only.

In another exemplary design, the visual quality evaluation module 104 calculates a plurality of distinct visual quality metrics (e.g., many of the aforementioned visual quality metrics) according to the data involved in the coding loop of the coding circuit 102, and determines each evaluated visual quality based on the distinct visual quality metrics. In other words, one evaluated visual quality may be obtained by referring to a composition of multiple visual quality metrics. For example, the visual quality evaluation module 104 may be configured to assign a plurality of pre-defined weighting factors to multiple visual quality metrics (e.g., a noise metric and a sharpness metric), and decide one evaluated visual quality by a weighted sum derived from the weighting factors and the visual quality metrics. For another example, the visual quality evaluation module 104 may employ a Minkowski equation to determine a plurality of non-linear weighting factors for the distinct visual quality metrics, respectively; and then determine one evaluated visual quality by combining the distinct visual quality metrics according to respective non-linear weighting factors. Specifically, based on the Minkowski equation, the evaluated visual quality $\Delta Q_m$ is calculated using following equation:

$$\Delta Q_m = \left(\sum_i (\Delta Q_i)^{n_m}\right)^{1/n_m},$$

where $$n_m = 1 + 2 \cdot \tanh\left(\frac{(\Delta Q)_{max}}{16.9}\right),$$

$\Delta Q_i$ is derived from each of the distinct visual quality metrics, and 16.9 is a single universal parameter based on psychophysical experiments. For yet another example, the visual quality evaluation module 104 may employ a training-based manner (e.g., a support vector machine (SVM)) to determine a plurality of trained weighting factors for the distinct visual quality metrics, respectively; and then determine one evaluated visual quality by combining the distinct visual quality metrics according to respective trained weighting factors. Specifically, supervised learning models with associated learning algorithms are employed to analyze the distinct visual quality metrics and recognized patterns, and accordingly determine the trained weighting factors.

After the evaluated visual quality is generated by the visual quality evaluation module 104, the evaluated visual quality is referenced by the de-blocking filter 119 to control/configure the operation of de-blocking filtering. As the evaluated visual quality is involved in making the video coding mode decision for de-blocking filtering, the source frame $IMG_{IN}$ is encoded based on characteristics of the human visual system to thereby allow a decoded/reconstructed frame to have enhanced visual quality.

Figure 2:
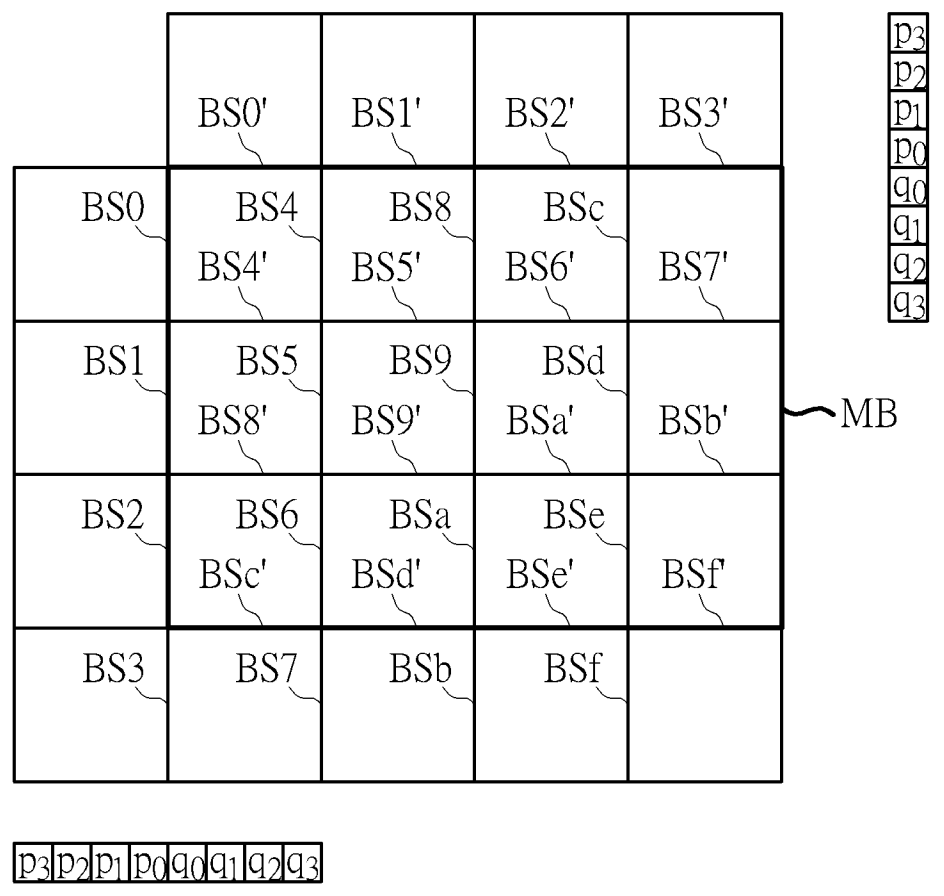

For example, the de-blocking filter 119 may decide a boundary strength (BS) of a block boundary between adjacent blocks according to the evaluated visual quality, where the evaluated visual quality in this case may provide visual quality information for one or both of the adjacent blocks. FIG. 2 is a diagram illustrating the boundary strength settings for a plurality of block boundaries. Taking the H.264 video coding standard for example, one 16×16 macroblock (MB) is divided into a plurality of 4×4 blocks. As can be seen from FIG. 2, boundary strength values BS0-BSf are assigned to vertical boundaries/edges of adjacent 4×4 blocks, and boundary strength values BS0'-BSf' are assigned to horizontal boundaries/edges between adjacent 4×4 blocks. Each of the boundary strengths BS0-BSf, BS0'-BSf' may be selected from a plurality of pre-defined boundary strength values such as BS=0 (skip), BS=1, BS=2, BS=3, and BS=4, where BS=4 means strongest filtering, and BS=0 means no filtering.

Figure 3:
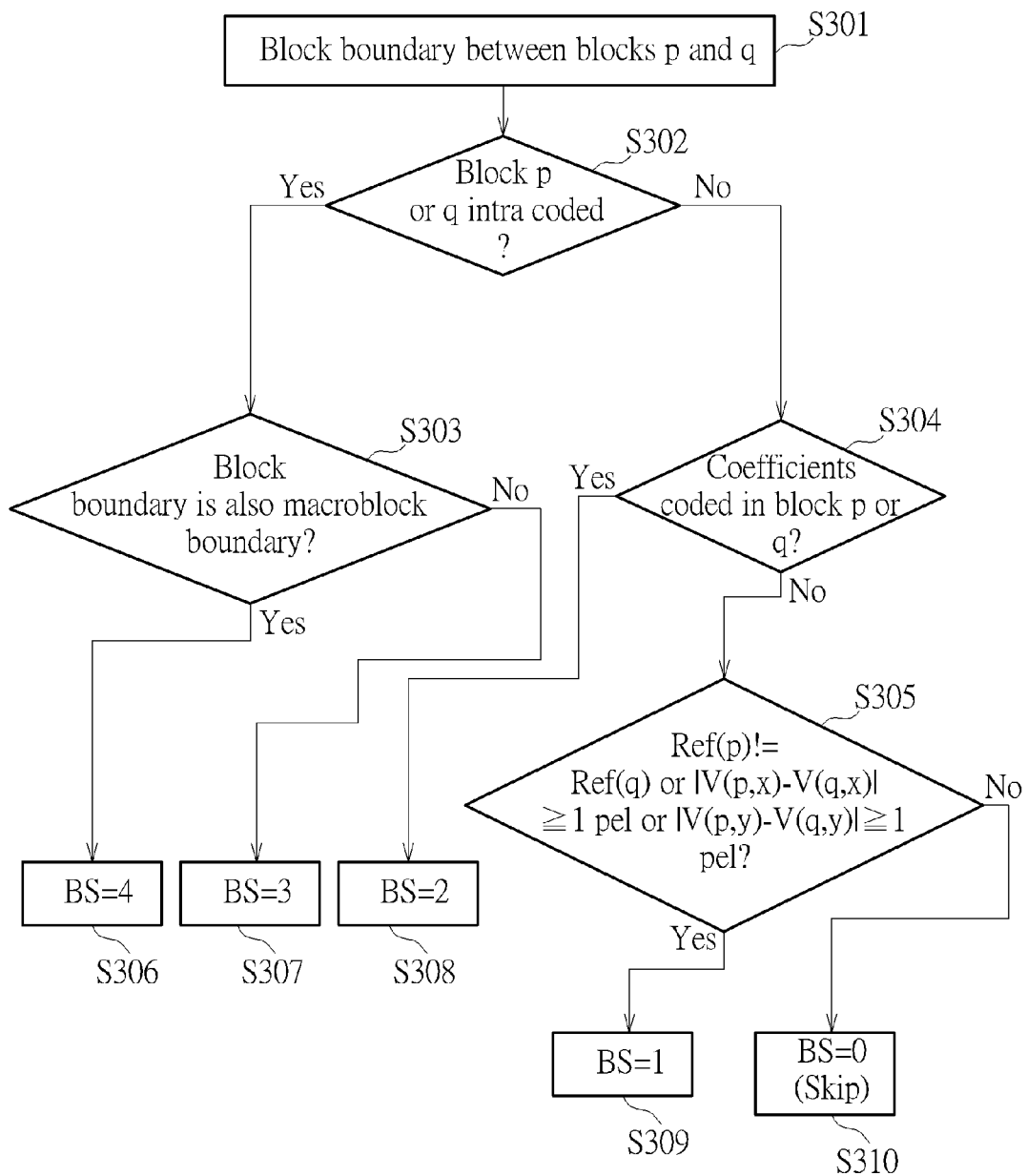
FIG. 3 is a flowchart illustrating a conventional non-visual-quality based de-blocking filtering strength decision.
Figure 4:
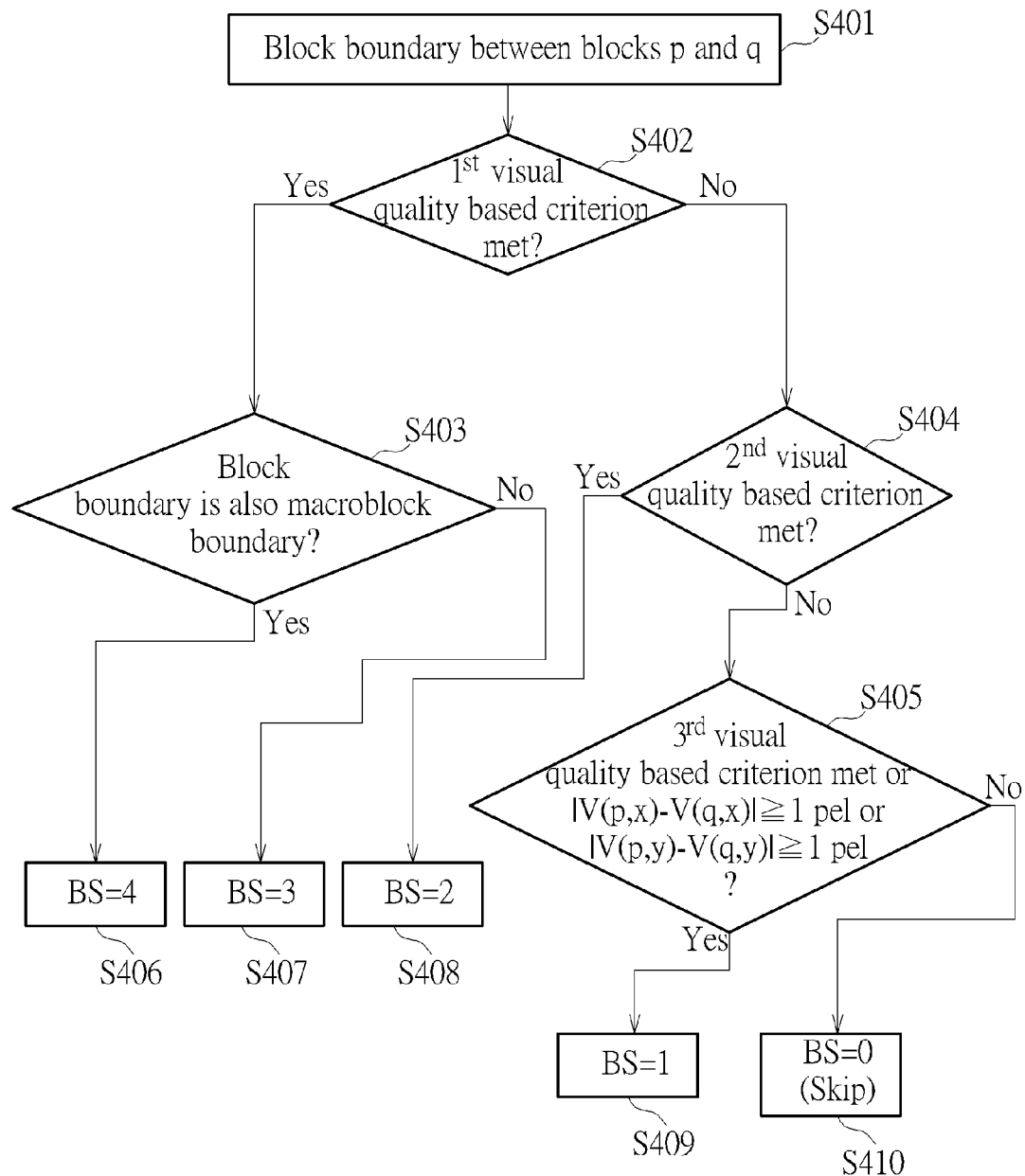
FIG. 4 is a flowchart illustrating a proposed visual quality based de-blocking filtering strength decision according to an embodiment of the present invention.

Please refer to FIG. 3 in conjunction with FIG. 4. FIG. 3 is a flowchart illustrating a conventional non-visual-quality based de-blocking filtering strength decision. FIG. 4 is a flowchart illustrating a proposed visual quality based de-blocking filtering strength decision according to an embodiment of the present invention. To determine the boundary strength value, the conventional video coding design checks non-visual-quality criteria. For example, as shown in FIG. 3, the non-visual-quality criteria may include whether any of the adjacent blocks p and q is intra coded (S302), whether there are coefficients coded in any of the adjacent blocks p and q (S304), whether the adjacent blocks p and q do not use the same reference frame (Ref(p)!=Ref(q)) (S305), and whether a motion vector difference of the adjacent blocks p and q is not smaller than one pixel (|V(p,x)−V(q,x)|≥1 pel or |V(p,y)−V(q,y)|≥1 pel) (S305). As shown in FIG. 3, the boundary strength is determined without actually considering the human visual perception. Hence, a reconstructed frame processed by de-blocking filtering with boundary strength values determined based on non-visual-quality criteria may not have the best visual quality.

In contrast to the conventional video coding design, the present invention proposes using the evaluated visual quality VQ(C or R') derived from data involved in the coding loop of the coding unit 102 to find the boundary strength value, where one evaluated visual quality VQ(C or R') for deciding the boundary strength of a vertical/horizontal boundary of adjacent blocks may be obtained by a single visual quality metric or a composition of multiple visual quality metrics, C represents raw data of the source frame $IMG_{IN}$ (particularly, pixel data of one or both of the adjacent blocks), and R' represents processed data derived from raw data of the source frame $IMG_{IN}$ (particularly, processed data derived from processing pixel data of one or both of the adjacent blocks by video coding). For example, one or more of the non-visual-quality criteria may be replaced by a visual quality based criterion, where the visual quality based criterion is checked to see if the evaluated visual quality satisfies a predetermined condition. In one exemplary design, some or all of the non-visual-quality criteria shown in FIG. 3, such as whether any of the adjacent blocks p and q is intra coded (S302), whether there are coefficients coded in any of the adjacent blocks p and q (S304), and whether the adjacent blocks p and q use the same reference frame (S305), may be replaced by different visual quality based criteria, as shown in FIG. 4. It should be noted that the boundary strength derivation shown in FIG. 4 is for illustrative purposes only, and is not meant to be a limitation of the present invention. That is, any de-blocking filter design using at least one boundary strength derivation rule configured to check a visual quality evaluation result falls within the scope of the present invention. As shown in FIG. 4, the boundary strength is determined with the human visual perception taken into consideration. Hence, a reconstructed frame processed by de-blocking filtering with boundary strength values determined based on visual-quality based criteria would have enhanced visual quality.

In an alternative design, both of the evaluated visual quality (e.g., VQ(C or R')) and the checking result of at least one non-visual-quality based criterion are used to control the de-blocking filtering operation (e.g., boundary strength derivation). For example, the de-blocking filter 119 refers to the evaluated visual quality to find a first de-blocking filtering setting (e.g., a boundary strength value for a block boundary between adjacent blocks), refers to the checking result of at least one non-visual-quality based criterion to find a second de-blocking filtering setting (e.g., a second boundary strength value for the block boundary between the adjacent blocks), and finally selects one of the first de-blocking filtering setting and the second de-blocking filtering setting as a target de-blocking filtering setting (e.g., a boundary strength value actually assigned to the block boundary between adjacent blocks).

For another example, the de-blocking filter 119 performs a coarse decision according to one of the evaluated visual quality and the checking result of at least one non-visual-quality based criterion to select M coarse de-blocking filtering settings (e.g., coarse boundary strength values for a block boundary between adjacent blocks) from all possible N de-blocking filtering settings (e.g., BS=0, BS=1, BS=2, BS=3 and BS=4), and performs a fine decision according to another of the evaluated visual quality and the checking result of at least one non-visual-quality based criterion to determine P fine de-blocking filtering settings from the coarse de-blocking filtering settings (N>M & M>P≥1), wherein a target de-blocking filtering setting (e.g., a boundary strength value actually assigned to the block boundary between adjacent blocks) is derived from the P fine de-blocking filtering settings. In a case where P=1, the target de-blocking filtering setting is directly determined by the fine decision based on the non-visual-quality checking result if the coarse decision is made based on the evaluated visual quality; or the target de-blocking filtering setting is directly determined by the fine decision based on the evaluated visual quality if the coarse decision is made based on the non-visual-quality checking result.

Figure 5:
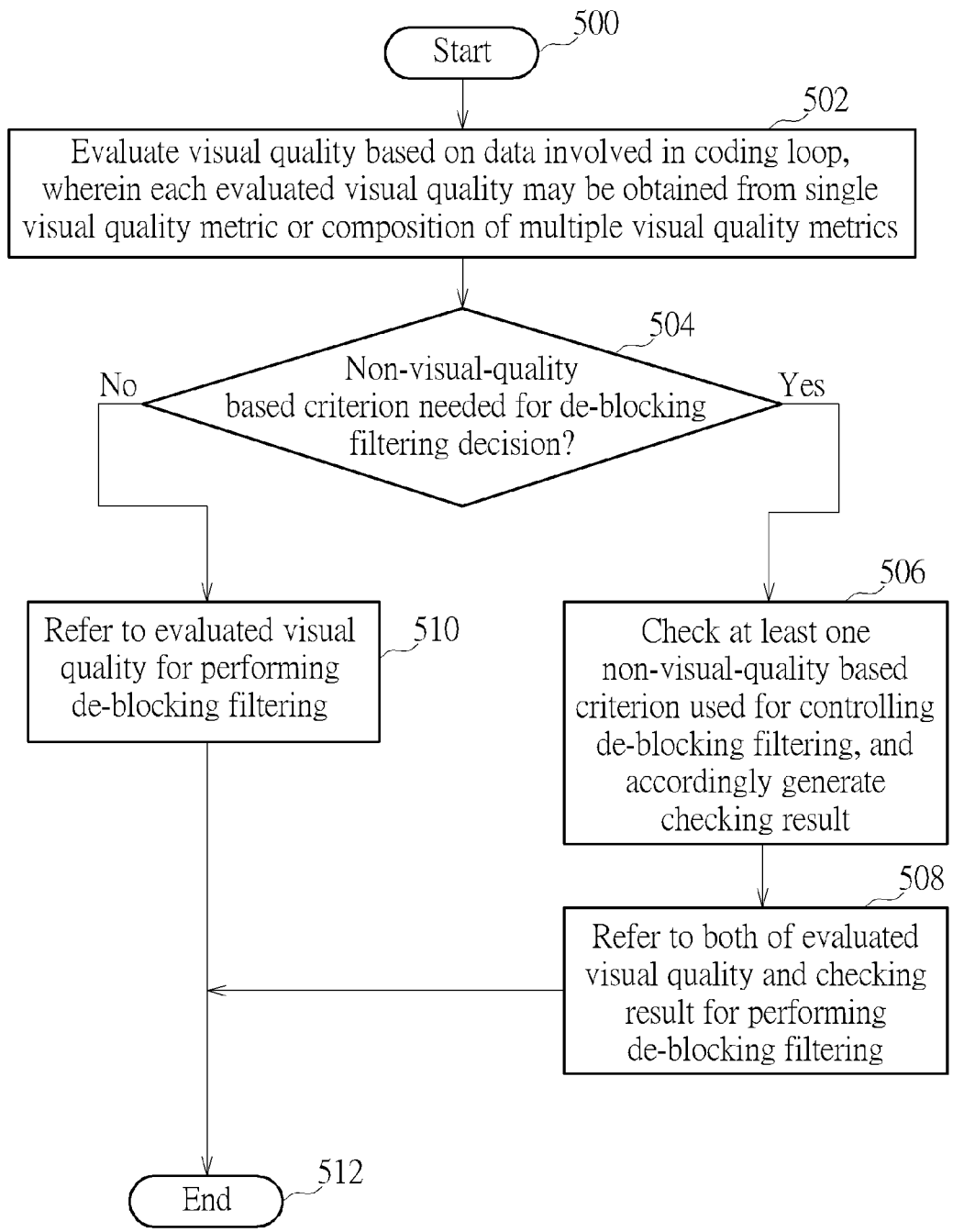
FIG. 5 is a flowchart illustrating a video coding method according to a first embodiment of the present invention.

FIG. 5 is a flowchart illustrating a video coding method according to a first embodiment of the present invention. Provided that the result is substantially the same, the steps are not required to be executed in the exact order shown in FIG. 5. The video coding method may be briefly summarized as below.

Step 500: Start.

Step 502: Evaluate visual quality based on data involved in a coding loop, wherein the data involved in the coding loop may be raw data of a source frame or processed data derived from the raw data of the source frame, and each evaluated visual quality may be obtained from a single visual quality metric or a composition of multiple visual quality metrics.

Step 504: Check if at least one non-visual-quality based criterion should be used for de-blocking filtering decision. If yes, go to step 506; otherwise, go to step 510.

Step 506: Check at least one non-visual-quality based criterion used for controlling de-blocking filtering, and accordingly generate a checking result.

Step 508: Refer to both of the evaluated visual quality and the checking result for performing the de-blocking filtering. For example, both of the evaluated visual quality and the checking result may be used for deciding the boundary strength of a block boundary between adjacent blocks. Go to step 512.

Step 510: Refer to the evaluated visual quality for performing the de-blocking filtering. For example, the evaluated visual quality may be used for deciding the boundary strength of a block boundary between adjacent blocks.

Step 512: End.

As a person skilled in the art can readily understand details of each step in FIG. 5 after reading above paragraphs, further description is omitted here for brevity.

As mentioned above, the evaluated visual quality determined by the visual quality evaluation module 104 can be referenced by the de-blocking filter 119 during de-blocking filtering. However, this is not meant to be a limitation of the present invention. In a second application, the de-blocking filter 119 may be arranged to refer to the aforementioned visual quality determined by the visual quality evaluation module 104 for deciding a target coding parameter associated with de-blocking filtering, where the target coding parameter may be a de-blocking filter parameter. In addition, the target coding parameter set based on the evaluated visual quality may be included in the bitstream BS generated by encoding the source frame $IMG_{IN}$. That is, the target coding parameter is a signaling parameter which is transmitted to a video decoding apparatus to facilitate the decoder-side video processing operation. As the visual quality evaluation performed by the visual quality evaluation module 104 has been detailed above, further description directed to obtaining the evaluated visual quality based on one or more visual quality metrics is omitted here for brevity.

In an alternative design, both of the evaluated visual quality (which is obtained based on data involved in the coding loop) and the checking result (which is obtained by checking at least one non-visual-quality criterion) are used to decide a target coding parameter (e.g., a de-blocking filter parameter) associated with de-blocking filtering, where the target coding parameter set based on the evaluated visual quality and the checking result may be included in the bitstream BS and transmitted to a video decoding apparatus.

For example, the de-blocking filter 119 refers to the evaluated visual quality to decide a first parameter setting with best visual quality, refers to the non-visual-quality checking result to decide a second parameter setting, and finally selects one of the first parameter setting and the second parameter setting to set the target coding parameter. For another example, the de-blocking filter 119 performs a coarse decision according to one of the evaluated visual quality and the non-visual-quality checking result to determine a plurality of coarse parameter settings, and performs a fine decision according to another of the evaluated visual quality and the non-visual-quality checking result to determine at least one fine parameter setting from the coarse parameter settings, wherein the target coding parameter (e.g., the de-blocking filter parameter) is derived from the at least one fine parameter setting.

Figure 6:
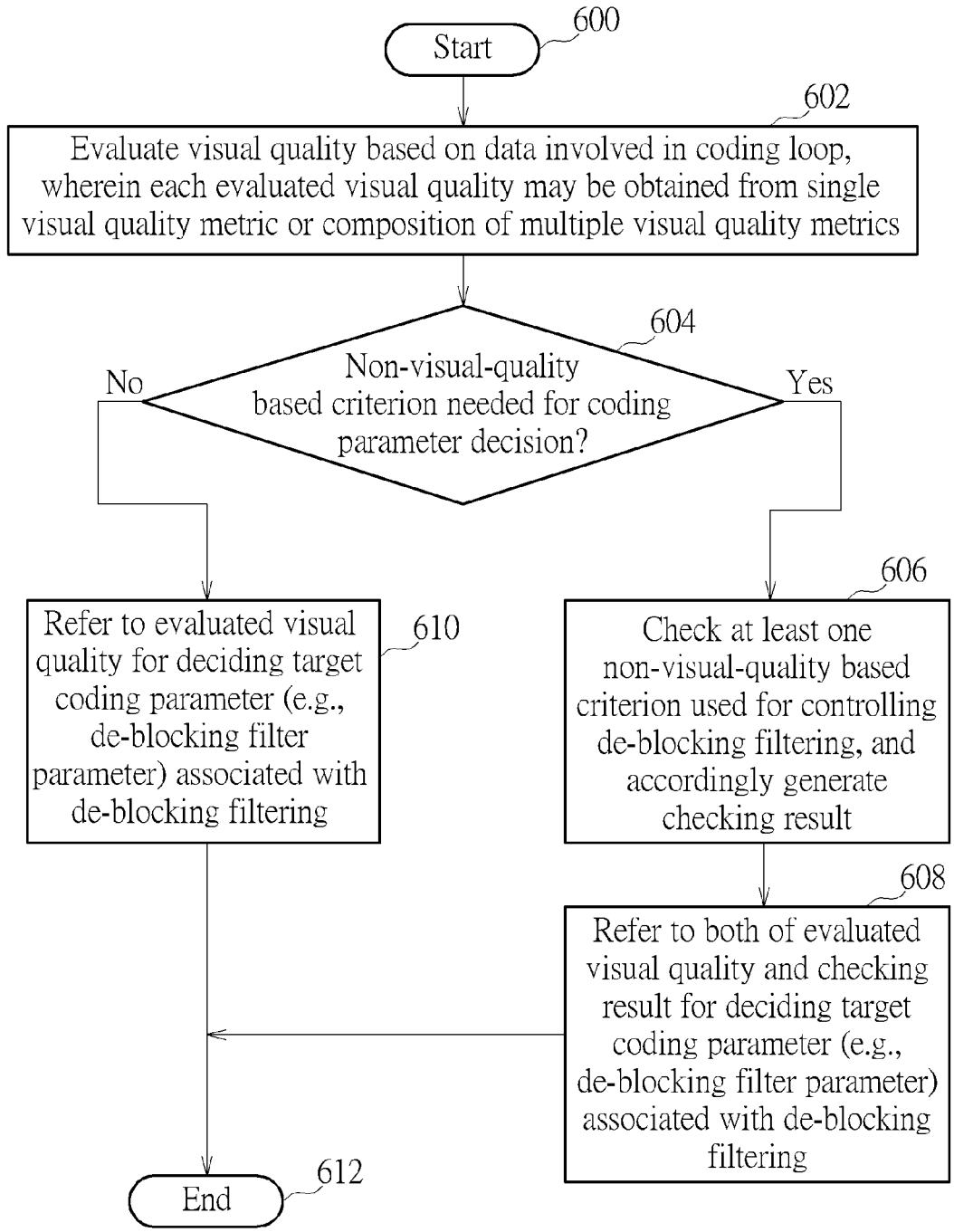
FIG. 6 is a flowchart illustrating a video coding method according to a second embodiment of the present invention.

FIG. 6 is a flowchart illustrating a video coding method according to a second embodiment of the present invention. Provided that the result is substantially the same, the steps are not required to be executed in the exact order shown in FIG. 6. The video coding method may be briefly summarized as below.

Step 600: Start.

Step 602: Evaluate visual quality based on data involved in a coding loop, wherein the data involved in the coding loop may be raw data of a source frame or processed data derived from the raw data of the source frame, and each evaluated visual quality may be obtained from a single visual quality metric or a composition of multiple visual quality metrics.

Step 604: Check if at least one non-visual-quality based criterion should be used for coding parameter decision. If yes, go to step 606; otherwise, go to step 610.

Step 606: Check at least one non-visual-quality based criterion used for controlling de-blocking filtering, and accordingly generate a checking result.

Step 608: Refer to both of the evaluated visual quality and the checking result for deciding a target coding parameter (e.g., a de-blocking filter parameter) associated with de-blocking filtering in video coding. Go to step 612.

Step 610: Refer to the evaluated visual quality for deciding a target coding parameter (e.g., a de-blocking filter parameter) associated with de-blocking filtering in video coding.

Step 612: End.

As a person skilled in the art can readily understand details of each step in FIG. 6 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video coding method, comprising:
utilizing a visual quality evaluation module for evaluating visual quality based on data involved in a coding loop;
checking at least one non-visual-quality based criterion used for controlling the de-blocking filtering, and accordingly generating a checking result; and
referring to at least the evaluated visual quality and the checking result for
performing de-blocking filtering, comprising:
performing a coarse decision according to one of the evaluated visual quality and the checking result to determine a plurality of coarse de-blocking filtering settings; and
performing a fine decision according to another of the evaluated visual quality and the checking result to determine at least one fine de-blocking filtering setting from the coarse de-blocking filtering settings, wherein a target de-blocking filtering setting is derived from the at least one fine de-blocking filtering setting.

2. The video coding method of claim 1, wherein the data involved in the coding loop is raw data of a source frame.

3. The video coding method of claim 1, wherein the data involved in the coding loop is processed data derived from raw data of a source frame.

4. The video coding method of claim 3, wherein the processed data includes transformed coefficients, quantized coefficients, reconstructed pixel data, motion-compensated pixel data, or intra-predicted pixel data.

5. The video coding method of claim 1, wherein the evaluated visual quality is derived from checking at least one image characteristic that affects human visual perception, and the at least one image characteristic includes sharpness, noise, blur, edge, dynamic range, blocking artifact, mean intensity, color temperature, scene composition, human face, animal presence, image content that attracts more or less interest, spatial masking, temporal masking, or frequency masking.

6. The video coding method of claim 1, wherein the step of evaluating the visual quality comprises:
calculating a single visual quality metric according to the data involved in the coding loop; and
determining each evaluated visual quality solely based on the single visual quality metric.

7. The video coding method of claim 1, wherein the step of evaluating the visual quality comprises:
calculating a plurality of distinct visual quality metrics according to the data involved in the coding loop; and
determining each evaluated visual quality based on the distinct visual quality metrics.

8. The video coding method of claim 7, wherein the step of determining each evaluated visual quality based on the distinct visual quality metrics comprises:
determining a plurality of weighting factors; and
determining each evaluated visual quality by combining the distinct visual quality metrics according to the weighting factors.

9. The video coding method of claim 8, wherein the weighting factors are determined by training.

10. The video coding method of claim 1, wherein the step of performing the de-blocking filtering comprises:
deciding a boundary strength of a block boundary between adjacent blocks.

11. A video coding method, comprising:
utilizing a visual quality evaluation module for evaluating visual quality based on data involved in a coding loop;
checking at least one predetermined criterion for applying de-blocking filtering to a block boundary between adjacent blocks, and accordingly generating a checking result; and
referring to at least the evaluated visual quality and the checking result for deciding a target coding parameter associated with the de-blocking filtering, comprising:
performing a coarse decision according to one of the evaluated visual quality and the checking result to determine a plurality of coarse parameter settings; and
performing a fine decision according to another of the evaluated visual quality and the checking result to determine at least one fine parameter setting from the coarse parameter settings, wherein the target coding parameter is derived from the at least one fine parameter setting.

12. The video coding method of claim 11, wherein the target coding parameter is included in a bitstream generated by encoding a source frame.

13. The video coding method of claim 11, wherein the data involved in the coding loop is raw data of a source frame.

14. The video coding method of claim 11, wherein the data involved in the coding loop is processed data derived from raw data of a source frame.

15. The video coding method of claim 14, wherein the processed data includes transformed coefficients, quantized coefficients, reconstructed pixel data, motion-compensated pixel data, or intra-predicted pixel data.

16. The video coding method of claim 11, wherein the evaluated visual quality is derived from checking at least one image characteristic that affects human visual perception, and the at least one image characteristic includes sharpness, noise, blur, edge, dynamic range, blocking artifact, mean intensity, color temperature, scene composition, human face, animal presence, image content that attracts more or less interest, spatial masking, temporal masking, or frequency masking.

17. The video coding method of claim 11, wherein the step of evaluating the visual quality comprises:
calculating a single visual quality metric according to the data involved in the coding loop; and
determining each evaluated visual quality solely based on the single visual quality metric.

18. The video coding method of claim 11, wherein the step of evaluating the visual quality comprises:
calculating a plurality of distinct visual quality metrics according to the data involved in the coding loop; and
determining each evaluated visual quality based on the distinct visual quality metrics.

19. The video coding method of claim 18, wherein the step of determining each evaluated visual quality based on the distinct visual quality metrics comprises:
determining a plurality of weighting factors; and
determining each evaluated visual quality by combining the distinct visual quality metrics according to the weighting factors.

20. The video coding method of claim 19, wherein the weighting factors are determined by training.

21. A video coding apparatus, comprising:
a visual quality evaluation module, arranged to evaluate visual quality based on data involved in a coding loop; and
a coding circuit, comprising the coding loop, the coding circuit arranged to check at least one non-visual-quality based criterion used for controlling the de-blocking filtering and accordingly generate a checking result, and further arranged to refer to at least the evaluated visual quality and the checking result for performing de-blocking filtering, wherein the coding circuit performs a coarse decision according to one of the evaluated visual quality and the checking result to determine a plurality of coarse de-blocking filtering settings, and performs a fine decision according to another of the evaluated visual quality and the checking result to determine at least one fine de-blocking filtering setting from the coarse de-blocking filtering settings, where a target de-blocking filtering setting is derived from the at least one fine de-blocking filtering setting.

22. A video coding apparatus, comprising:

a visual quality evaluation module, arranged to evaluate visual quality based on data involved in a coding loop; and a coding circuit, comprising the coding loop, the coding circuit arranged to check at least one predetermined criterion for applying de-blocking filtering to a block boundary between adjacent blocks and accordingly generate a checking result, and further arranged to refer to at least the evaluated visual quality and the checking result for deciding a target coding parameter associated with the de-blocking filtering, wherein the coding circuit performs a coarse decision according to one of the evaluated visual quality and the checking result to determine a plurality of coarse parameter settings, and performs a fine decision according to another of the evaluated visual quality and the checking result to determine at least one fine parameter setting from the coarse parameter settings, where the target coding parameter is derived from the at least one fine parameter setting.

* * * * *